(12) United States Patent
Sheehan

(10) Patent No.: US 9,262,187 B2
(45) Date of Patent: Feb. 16, 2016

(54) EXTENSION POINT DECLARATIVE REGISTRATION FOR VIRTUALIZATION

(75) Inventor: John M. Sheehan, Cambridge, MA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 839 days.

(21) Appl. No.: 12/700,723

(22) Filed: Feb. 5, 2010

(65) Prior Publication Data

US 2011/0197184 A1    Aug. 11, 2011

(51) Int. Cl.
*G06F 9/455* (2006.01)
*G06F 9/445* (2006.01)

(52) U.S. Cl.
CPC ........ *G06F 9/45533* (2013.01); *G06F 9/44505* (2013.01); *G06F 9/44521* (2013.01); *G06F 9/45529* (2013.01)

(58) Field of Classification Search
CPC ............ G06F 9/45533; G06F 9/44521; G06F 9/45529; G06F 9/44505
USPC ........................................................ 717/168
See application file for complete search history.

(56) References Cited

U.S. PATENT DOCUMENTS

| | | | |
|---|---|---|---|
| 6,851,112 B1* | 2/2005 | Chapman ............ | G06F 9/45504 718/1 |
| 2005/0076326 A1* | 4/2005 | McMillan et al. ............ | 717/100 |
| 2006/0015601 A1 | 1/2006 | Jasnowski et al. | |
| 2006/0206863 A1 | 9/2006 | Shenfield et al. | |
| 2006/0277537 A1 | 12/2006 | Chan et al. | |
| 2007/0033640 A1 | 2/2007 | Herness | |
| 2007/0156913 A1 | 7/2007 | Miyamoto et al. | |
| 2007/0180444 A1 | 8/2007 | Hoover et al. | |
| 2007/0256073 A1* | 11/2007 | Troung ................... | G06F 21/53 718/1 |
| 2007/0277109 A1 | 11/2007 | Chen et al. | |

(Continued)

FOREIGN PATENT DOCUMENTS

CN    101593249 A    12/2009

OTHER PUBLICATIONS

"Creating, Loading and Using Eclipse RCP Extension Points (Eclipse 3.4—Ganymede)", Retrieved at<<http://rajakannappan.blogspot.com/2009/04/working-with-eclipse-rcp-extension.html>>, Apr. 14, 2009, pp. 5.

(Continued)

*Primary Examiner* — Idriss N Alrobaye
*Assistant Examiner* — Brooke Taylor
(74) *Attorney, Agent, or Firm* — Henry Gabryjelski; Kate Drakos; Micky Minhas

(57) ABSTRACT

An extension point virtualization system uses operating system-provided reparse points to provide minimal extension point registration. Reparse points preserve application isolation while removing the scale problem of writing custom extension point proxies for each extension point. Instead, the system can use a single file system filter that generically handles application virtualization reparse points, and store reparse point data for extension points that need redirection. Many extension points can be handled by redirecting the operating system from a typical location for an application resource to a virtualized safe location for the application resource. Thus, the system simplifies the process of handling new extension points by allowing an application virtualization system to simply register new locations that should be handled with reparse points and to then handle registered locations generically.

7 Claims, 3 Drawing Sheets

(56) References Cited

U.S. PATENT DOCUMENTS

2009/0031202 A1    1/2009  Branda et al.
2009/0106780 A1*   4/2009  Nord et al. .................... 719/329
2009/0125989 A1    5/2009  Flaherty et al.

OTHER PUBLICATIONS

"Plugins, Extensions, and Extension Points", Retrieved at<<http://jlense.sourceforge.net/project/platform.html>>, 2002-2003, pp. 3.

Grubber, et al., "The Eclipse 3.0 Platform: Adopting OSGi Technology", Retrieved at<<http://xml.coverpages.org/Gruber-OGSiSJ442.pdf>>, IBM Systems Journal, vol. 44, No. 2, 2005.pp. 1-11.

Hatje, et al., "Control System Studio (CSS)", Retrieved at<<https://accelconf.web.cern.ch/accelconf/ica07/PAPERS/MOPB03.PDF>>,Oct. 26, 2009, pp. 37-39.

Office Action from corresponding Chinese Patent Application No. 201180008320.6, mailed Apr. 2, 2013, 9 pages.

* cited by examiner

EXTENSION POINT DECLARATIVE REGISTRATION FOR VIRTUALIZATION

BACKGROUND

Virtualization refers to the execution of a virtual machine by physical hardware and then running operating systems and/or applications virtually on the virtual machine. The virtual machine may represent a least common denominator of hardware functionality or may represent a well-known configuration for which it is easy to prepare an operating system and applications. Many data centers use virtualization to be able to easily move a virtual machine to new physical hardware as resource requirements increase, for maintenance cycles, and to balance physical server loads. Virtualization is useful for many situations, but can also impose limitations that occur due to many virtual machines contending for the same resources (e.g., central processing unit (CPU), memory, and network interface card (NIC)).

Application virtualization provides a virtual machine at the level of a single application. For example, a host operating system may natively run some applications, while providing a virtual environment for running others. This may allow the operating system, for example, to run applications designed for a different operating system. Application virtualization blurs the distinction for the user between applications running natively in the host operating system and applications running in a virtual machine. For example, both types of applications may appear side by side in a taskbar or menu provides by the operating system shell. MICROSOFT Application Virtualization (App-V), for example, transforms applications into centrally managed virtual services that are not installed and do not conflict with other applications. In a physical environment, every application depends on its operating system (OS) for a range of services, including memory allocation, device drivers, and much more. Incompatibility between an application and its OS can be addressed by either server virtualization or presentation virtualization—but for incompatibility between two applications installed on the same instance of an OS is solved by application virtualization.

Operating systems need to have their behaviors modified to fit the needs of customers. For example, the user may install MICROSOFT Word, which registers a file type association. This file type association changes how the operating system behaves. When the user clicks on a document with the Word file type association, the operating system invokes MICROSOFT Word. File type associations are a specific example of an operating system extension point. One part of virtualization is isolation, meaning one application cannot see another application and that one application's actions do not affect the operating system, or only affect the operating system through a proxy. In the file type association case, one example of a proxy is the MICROSOFT App-V client that detects and registers the file type association as a proxy on behalf of the application. In this way, MICROSOFT App-V is aware of the operating system modification and can reverse it when the virtualized application is removed.

Unfortunately, building a custom proxy for each operating system extension point is not practical or scalable. There are over 3000 extension points in MICROSOFT WINDOWS, making it virtually impossible to write a proxy for each one. Moreover, with support for each new operating system, additional extension points need to be detected and managed to keep application virtualization working as expected. The constantly expanding number of extension points consumes development and testing time and takes time away from other new features.

SUMMARY

An extension point virtualization system is described herein that uses operating system-provided reparse points to provide minimal extension point registration. Reparse points preserve application isolation while removing the scale problem of writing custom extension point proxies for each extension point. Many extension points can be handled by redirecting the operating system from a typical location for an application resource to a virtualized safe location for the application resource. The extension point virtualization system uses reparse points to eliminate the need for custom proxies for each extension point. Instead, the system can use a single file system filter that generically handles application virtualization reparse points, and store reparse point data for extension points that need redirection. Thus, the system simplifies the process of handling new extension points by allowing an application virtualization system to simply register new locations that can be handled with reparse points and to then handle registered locations generically.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
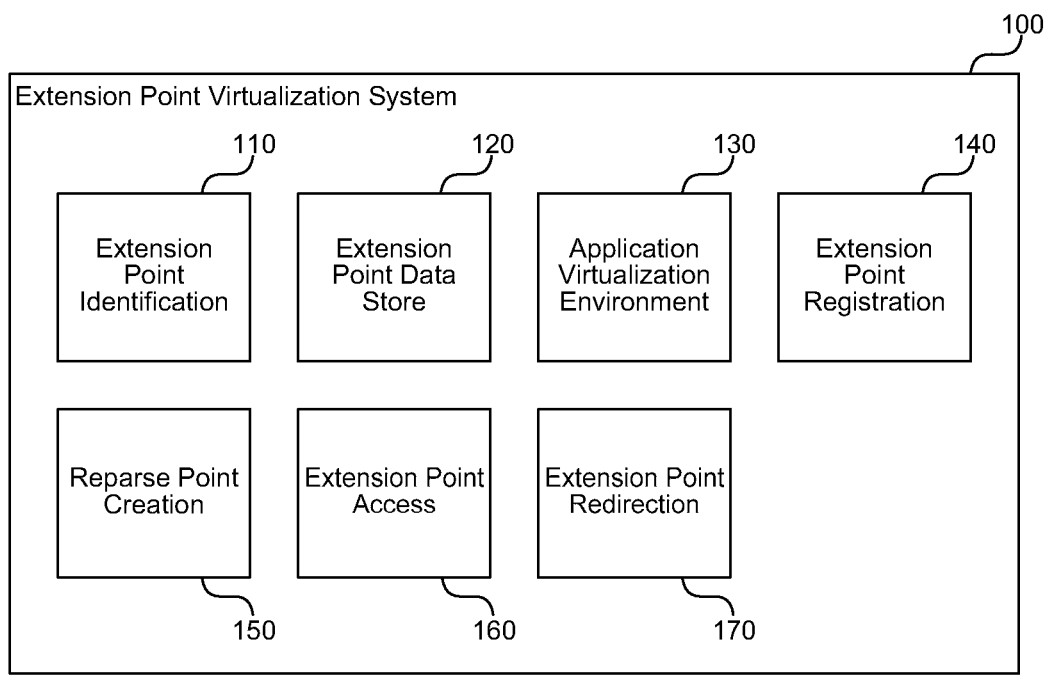
FIG. 1 is a block diagram that illustrates components of the extension point virtualization system, in one embodiment.

An extension point virtualization system is described herein that uses operating system-provided reparse points to provide minimal extension point registration. Reparse points preserve application isolation while removing the scale problem of writing custom extension point proxies for each extension point. Many extension points can be handled by redirecting the operating system from a typical location for an application resource to a virtualized safe location for the application resource. For example, applications that previously installed files into the operating system directory may be redirected to install those files into the application's own directory (even though application virtualization fools the application into thinking the files are still in the operating system directory).

A file or directory can contain a reparse point, which is a collection of user-defined data. The format of this data is understood by the application that stores the data and a file system filter, which an application developer installs to interpret the data and process the file. When an application sets a reparse point, it stores this data, plus a reparse tag, which uniquely identifies the data it is storing. When the file system opens a file with a reparse point, it attempts to find the file system filter associated with the data format identified by the reparse tag. If a file system filter is found, the filter processes the file as directed by the reparse data. If a file system filter is not found, the file open operation fails. For example, reparse points are used to implement NTFS file system links and the MICROSOFT Remote Storage Server (RSS). RSS uses an administrator-defined set of rules to move infrequently used files to long-term storage, such as tape or optical media. RSS uses reparse points to store information about the file in the file system. This information is stored in a stub file that contains a reparse point whose data points to the device where the actual file is located. The file system filter can use this information to retrieve the file. Reparse points are also used to implement mounted folders.

The extension point virtualization system uses reparse points to eliminate the need for custom proxies for each extension point. Instead, the system can create a single file system filter that generically handles application virtualization reparse points, and store reparse point data for extension points that need redirection. For example, the system can associate a reparse point with a file or registry key, regardless of the specific extension purpose of that file or registry key. Thus, the system simplifies the process of handling new extension points by allowing an application virtualization system to simply register new locations that can be handled with reparse points and to then handle registered locations generically.

Application virtualization gathers up the file and registry data for an application and places this in a store called a package, making the application think that the files and registry entries are installed locally, even though they are not. The previous method of registering extension points created a proxy for each extension point. This proxy would detect that the package was present on the system, and extract enough metadata to register the extension point with the operating system. The proxy would be invoked when the extension point was invoked, find the right package, and hand off the work to that package. In contrast, the extension point virtualization system described herein uses an operating system facility, the reparse point (or symbolic link in UNIX), to minimally register extension points. A reparse point is an operating system facility that tells the operating system that when a particular path is used in an operating system application-programming interface (API), the operating system should instead look to a substitute path for the data.

The extension point virtualization system causes the redirection to occur to a location in virtual package. By doing this, the system provides a way to allow new extension points to be added without a proxy, while continuing to isolate the application from the operating system. Take the example of the ".txt" file type association, realizing this technique works with other types of extension points. The file type association has a registry key that causes the operating system to run a command line specifying a path to an executable file when a user clicks on this file type association from the operating system shell (e.g., MICROSOFT WINDOWS Explorer). In the default case the registry key data is "HKEY_CLASSES_ROOT\txtfile\shell\open\command=% SystemRoot %\system32\NOTEPAD.EXE %1," which causes the operating system to run Notepad to open the file. The extension point virtualization system detects that a package registering the ".txt" file type association is on the system, and places a reparse point in the registry so that when the shell opens HKEY_CLASSES ROOT\txtfile\shell\open\command it will be reparsed to HKCR\[APP GUID]\txtfile\shell\open\command. In this case, [APP GUID] is a package-specific globally unique identifier (GUID).

This technique can be generalized to other extension points as well as to extension points that do not include a single registry entry but rather multiple registry entries across multiple locations, as well as files and directories. The extension point virtualization system works with the package (which is the data), the application virtualization environment (e.g., the MICROSOFT App-V client), which performs the registration on behalf of the package, and a set of extension points. The extension points can be expressed in a declarative extensible markup language (XML) syntax, so that the application virtualization environment can easily add new extension points without requiring modifications to the environment or the package.

FIG. 1 is a block diagram that illustrates components of the extension point virtualization system, in one embodiment. The system 100 includes an extension point identification component 110, an extension point data store 120, an application virtualization environment 130, an extension point registration component 140, a reparse point creation component 150, an extension point access component 160, and an extension point redirection component 170. Each of these components is described in further detail herein.

The extension point identification component 110 identifies extension points through which an operating system or application can be extended by third party programmatic code. For example, the component may detect a registry key through which application add-ins can be registered to be invoked by the application. In some cases, extension points are identified manually by process monitoring or other tools used by an administrator to watch an application's behavior as the application runs. For example, the administrator can use a registry monitoring locations to determine the registry locations read by an application or the operating system.

The extension point data store 120 stores identified extension points in a declarative format. The extension point data store 120 may include a file (e.g., an XML file), a database, a network-based data store, a cloud-based storage service, or other storage medium from which a list of identified extension points can be retrieved. An administrator or application environment author may add new extension points over time as they are discovered, so that even previously deployed virtualized applications can benefit from increased operating system isolation by protection from modifications to the operating system previously undetected by the application environment. In addition, independent software vendors (ISVs) may contribute lists of their own application extension points for addition to the data store 120 so that applications that modify their applications can be more easily virtualized and isolated.

The application virtualization environment 130 provides a level of indirection between the virtual application and the host operating system. The wrapper may be very thin allowing the application to run nearly natively, such as when the application is designed to run on the host operating system. Alternatively or additionally, the wrapper may provide APIs and satisfy other constraints expected by applications designed for other operating systems or operating system versions. Thus, the application virtualization environment 130 provides a virtual application with the environment for which the application was designed using the available resources of the host operating system.

The extension point registration component 140 detects installation of a virtual application package that references an identified extension point. The component 140 accesses the extension point data store 120 to load a list of identified extension points and compares the list to packages invoked by a user. If a match is found, the component 140 invokes the reparse point creation component 150 to create a reparse point redirecting the application to look for the extension point data within the application package.

The reparse point creation component 150 creates a reparse point for an identified extension point and the detected virtual application package that references the identified extension point. For example, if the extension point registration component 140 detects a package registering a file type association, then the reparse point creation component 150 creates a reparse point for the registry entry within the file type association that describes the application to launch when the file type association is invoked. The created reparse point redirects the registry entry to a location within the detected virtual application package.

The extension point access component 160 detects access of the created reparse point and invokes the extension point redirection component 170 to cause the operating system to look for specified data in a location associated with the detected virtual application package. Although described as a separate component, the extension point virtualization system 100 may rely on default operating system behavior to allow the operating system to perform the redirection without informing the extension point virtualization system 100. However, the operating system does allow registration of a file system filter that is invoked when a reparse point is accessed and the system may, in some embodiments, use this functionality to detect access and perform custom handling. This may be useful, for example, for debugging and auditing where application requests are being redirected.

The extension point redirection component 170 causes the operating system or an application to look for specified data referenced by a reparse point in a location associated with the detected virtual application package. As noted previously, the extension point virtualization system 100 may rely on default behavior of the operating system to perform the redirection as a function of the reparse point without involving the extension point virtualization system 100.

The computing device on which the extension point virtualization system is implemented may include a central processing unit, memory, input devices (e.g., keyboard and pointing devices), output devices (e.g., display devices), and storage devices (e.g., disk drives or other non-volatile storage media). The memory and storage devices are computer-readable storage media that may be encoded with computer-executable instructions (e.g., software) that implement or enable the system. In addition, the data structures and message structures may be stored or transmitted via a data transmission medium, such as a signal on a communication link. Various communication links may be used, such as the Internet, a local area network, a wide area network, a point-to-point dial-up connection, a cell phone network, and so on.

Embodiments of the system may be implemented in various operating environments that include personal computers, server computers, handheld or laptop devices, multiprocessor systems, microprocessor-based systems, programmable consumer electronics, digital cameras, network PCs, minicomputers, mainframe computers, distributed computing environments that include any of the above systems or devices, and so on. The computer systems may be cell phones, personal digital assistants, smart phones, personal computers, programmable consumer electronics, digital cameras, and so on.

The system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Figure 2:
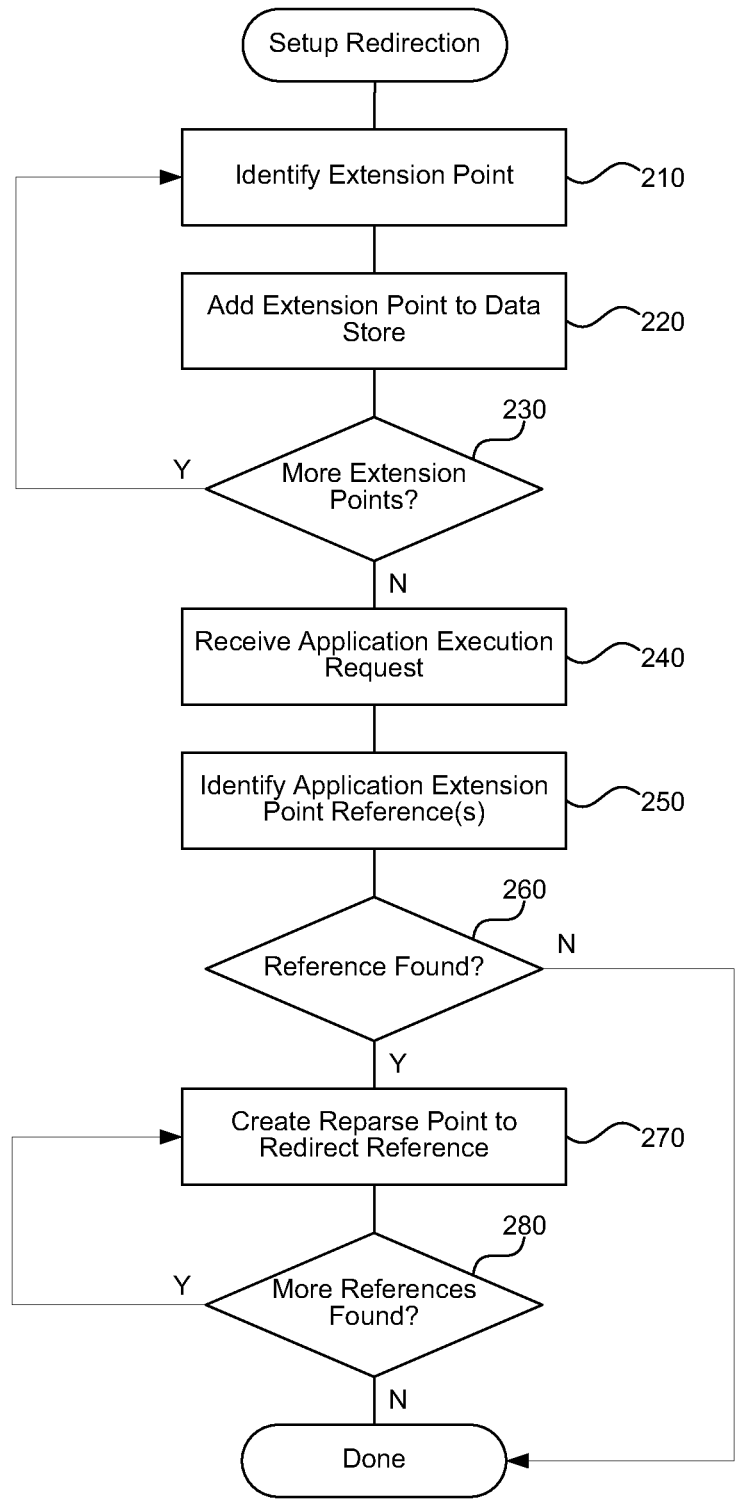
FIG. 2 is a flow diagram that illustrates the processing of the extension point virtualization system to identify extension points and setup application redirection for identified extension points, in one embodiment.

FIG. 2 is a flow diagram that illustrates the processing of the extension point virtualization system to identify extension points and setup application redirection for identified extension points, in one embodiment. Beginning in block 210, the system identifies an extension point. For example, the system may receive a list of extension points from an operating system vendor or ISV for addition to the extension point data store. Alternatively or additionally, a virtualization system developer or system administrator using application virtualization may manually identify extension points, such as through process monitoring tools.

Continuing in block 220, the system adds the identified extension point to an extension point data store. The extension point data store may comprise a declarative format, such as an XML file, that lists known extension points and associated resource paths. When the system detects a reference to an extension point path in an application package, the system performs the steps described herein to isolate and redirect the application's modification of the operating system. Continuing in decision block 230, if there are more extension points to identify, then the system loops to block 210, else the system continues at block 240. Note that although illustrated for ease of explanation in the same flow diagram, the preceding steps may occur separately from the following steps and may occur on an ongoing basis as new extension points are discovered. Likewise, the following steps may occur repeatedly for many applications as each virtualized application is executed by the system.

Continuing in block 240, the system receives an application execution request that specifies a virtual application package. Typically, this occurs when a user runs an application from the operating system shell that has been setup by an administrator to be virtualized. The application generally is not even installed on the user's computer but the user's computer contains a sufficient reference to locate and run the virtual application package stored centrally (e.g., on a network). When a virtual application package is invoked, the system runs the application virtualization environment described herein as a client to guide the application virtualization process.

Continuing in block 250, the system identifies one or more application extension point references within the specified virtual application package by comparing one or more paths referenced by the virtual application package to those in the extension point data store. For example, an application may register a file type association or a word processing application add-in through a registry-based extension point. If the registry location is on the list stored by the extension point data store, then the system determines that the application package references an extension point. Continuing in decision block 260, if the system detects an extension point reference, then the system continues at block 270, else the system completes.

Continuing in decision block 270, the system creates a reparse point to redirect an identified application extension point reference to an isolated location within the specified virtual application package. The reparse point causes accesses of the extension point to look for data within the application package and prevents the application package from modifying the operating system directly. Continuing in decision block 280, if the system detected additional application extension point references, then the system loops to block 270 to create reparse points for the each additional reference, else the system completes. After block 280, these steps conclude.

Figure 3:
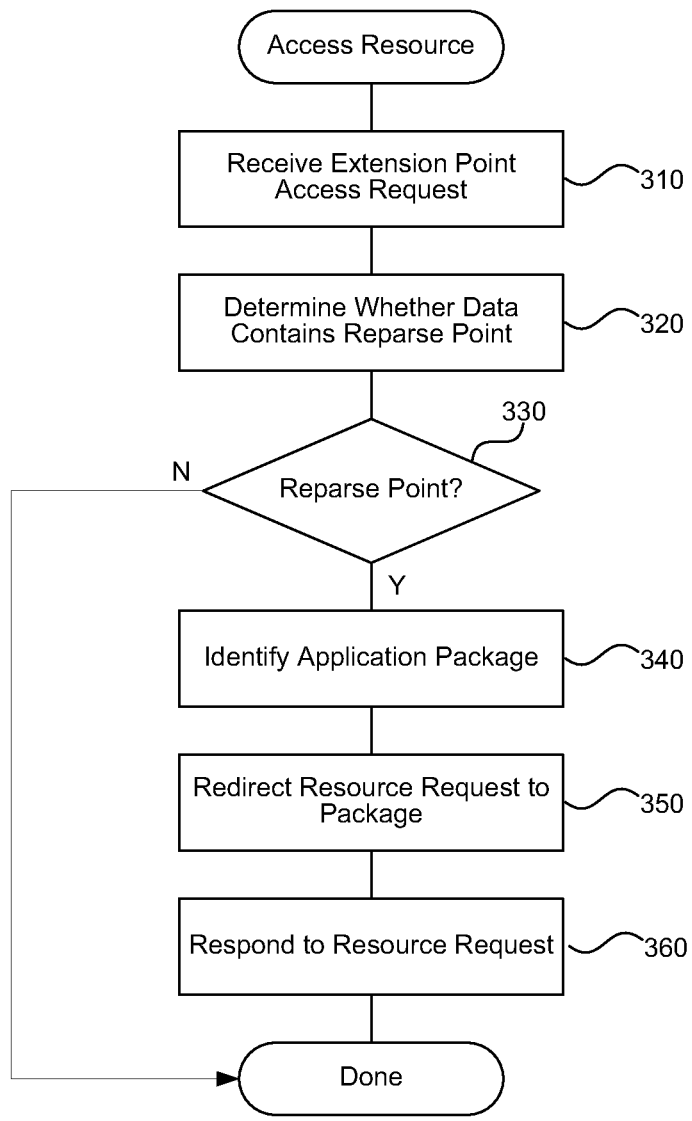
FIG. 3 is a flow diagram that illustrates the processing of the virtualization system to respond to a request to access a resource through an extension point, in one embodiment.

FIG. 3 is a flow diagram that illustrates the processing of the virtualization system to respond to a request to access a resource through an extension point, in one embodiment. Beginning in block 310, the system receives a resource access request that references a resource path. For example, an application may call a file open API provided by the operating system and specify a path to a file that the application requests to open. Alternatively or additionally, other applications, such as the operating system shell, may attempt to access a resource location through which applications can extend the functionality of the operating system or application.

Continuing in block 320, the extension point virtualization system detects whether the resource referenced by the path includes an associated reparse point. For example, the operating system may look for data associated with the resource where reparse point data is stored. Continuing in decision block 330, if the system detected a reparse point, then the system continues at block 340, else the system completes. Continuing in block 340, the extension point virtualization system identifies a virtual application package associated with the referenced path. For example, the reparse point may include an application GUID that identifies the application package. The system may include a common method of mapping application GUIDs to application packages, such as storing application packages in a well-known location using the application GUID.

Continuing in block 350, the extension point virtualization system redirects the resource request to the identified virtual application package. For example, the operating system may forward the resource request to a registered file system driver after detecting the reparse point or handle the request in a default manner, such as by redirecting the request to a specified location. As an example, the system may replace a file path contained in the received request with a file path associated with the virtual application package. Continuing in block 360, the extension point virtualization system responds to the redirected resource request by providing access to the requested resource. For example, the operating system may open an identified file and provide the file data in response to the request. The application behaves as if the data is where the application normally stores it and the virtualization system modifies requests to point to the location where the data is actually stored. Because of the redirection performed by the reparse point, the application virtualization works correctly whether the resource request comes from the application, another process, or other sources. After block 360, these steps conclude.

In some embodiments, the extension point virtualization system stores application data in a package file format. A package file can be any file format capable of storing multiple other files and types of data. For example, common existing package file formats include ZIP, CAB, RAR, SFT, and other similar formats. Package files often include compression for reducing file size and other features (e.g., encryption) in addition to allowing multiple files to be stored in one archive format. A package file for a virtualized application may include registry hives, files, databases, and other types of data that are used by the virtual application. The operating system may mount the package files like a directory, a volume, a disk drive, or other resource so that the virtual application can reference the items stored within the package file using common operating system APIs for file and other resource manipulation. In some embodiments, the extension point virtualization system may include virtual application data in the executable of the virtual application, so that the application can be distributed as a single EXE file with self-extracting data. Although several examples are described here, the extension point virtualization system is not limited to any particular manner of storing application data, and storage mechanisms other than those described can be used to achieve similar results.

From the foregoing, it will be appreciated that specific embodiments of the extension point virtualization system have been described herein for purposes of illustration, but that various modifications may be made without deviating from the spirit and scope of the invention. Accordingly, the invention is not limited except as by the appended claims.

I claim:

1. A computer system for generically handling virtualization of operating system and application extension points, the system comprising:
    a processor and memory configured to execute software instructions;
    an extension point identification component configured to identify extension points through which an operating system or application can be extended by third party programmatic code;
    an extension point data store configured to store identified extension points in a declarative format;
    an application virtualization environment configured to provide a level of indirection between a virtual application and a host operating system;
    an extension point registration component configured to detect installation of a virtual application package that references an identified extension point;
    a reparse point creation component configured to create a reparse point for an identified extension point pointing to the detected virtual application package that references the identified extension point, wherein the reparse point prevents the virtual application package from modifying the operating system directly;
    an extension point access component configured to detect access of the created reparse point and invoke an extension point redirection component;
    and an extension point redirection component configured to cause the host operating system or an application to look for specified data referenced by a reparse point in a location associated with the detected virtual application package.

2. The system of claim 1 wherein the extension point identification component is further configured to automatically identify extension points based on process monitoring to detect paths accessed by an application during execution.

3. The system of claim 1 wherein the extension point data store comprises an XML file that includes a list of identified extension points.

4. The system of claim 1 wherein the extension point data store is further configured to receive new extension points over time as they are discovered, so that previously deployed virtualized applications can benefit from increased operating system isolation by protection from modifications to the operating system previously undetected by the application environment.

5. The system of claim 1 wherein the application virtualization environment is further configured to provide the virtual application with an environment for which the application was designed using the available resources of the host operating system.

6. The system of claim 1 wherein the extension point registration component is further configured to access the extension point data store to load a list of identified extension points and compare the list to a virtual application package invoked by a user.

7. The system of claim 1 wherein the extension point access component is further configured to receive access information from a file system filter that is invoked when a created reparse point is accessed.

* * * * *